April 26, 1966 — E. R. PLASKO — 3,248,080
MOTOR-SPRING OPERATED VALVE
Filed April 18, 1962
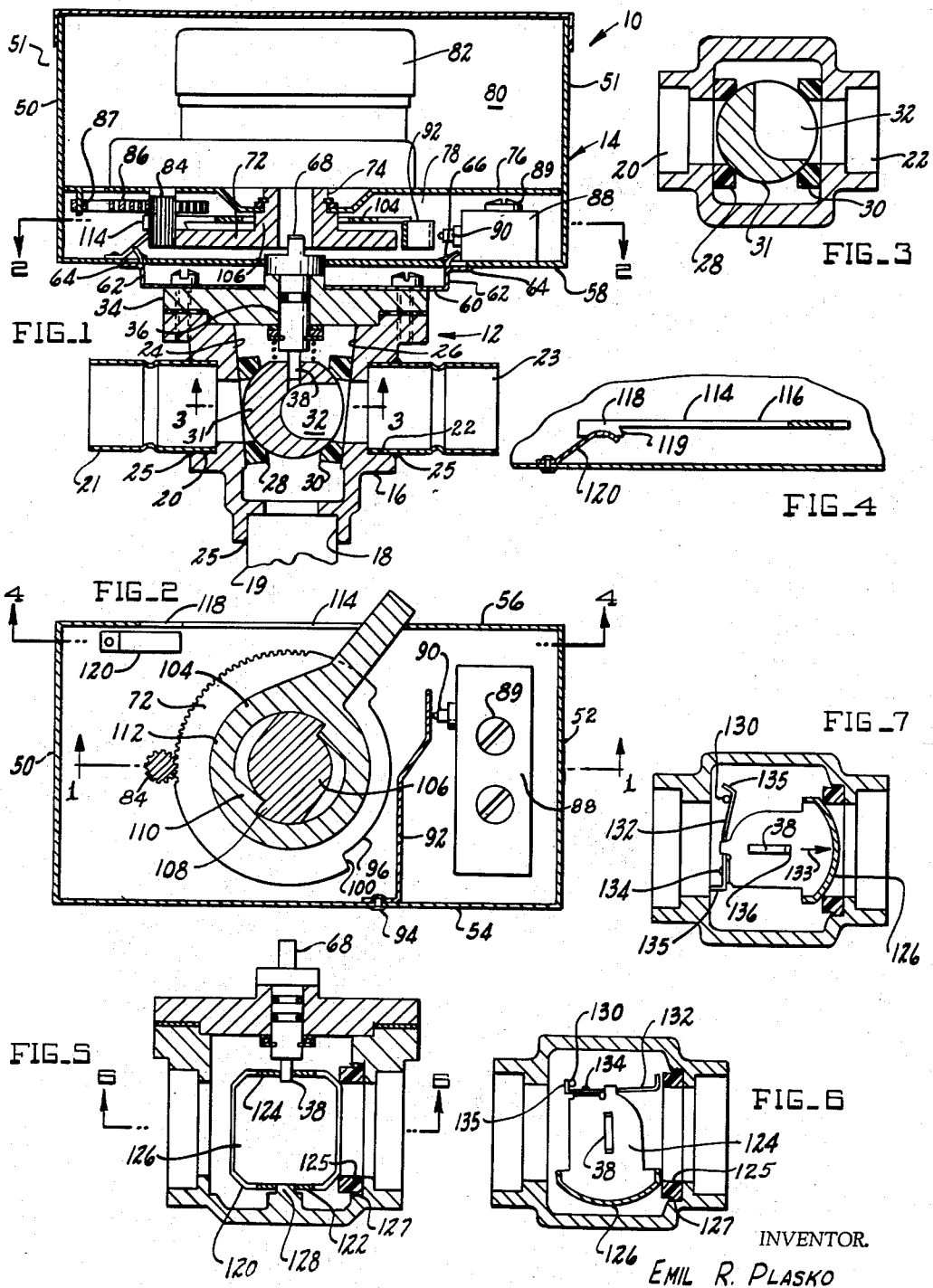
INVENTOR.
EMIL R. PLASKO
BY Andrew K. Foulds
his ATTORNEY 3,248,080
MOTOR-SPRING OPERATED VALVE
Emil R. Plasko, Walled Lake, Mich., assignor to American
Radiator & Standard Sanitary Corporation, New York,
N.Y., a corporation of Delaware
Filed Apr. 18, 1962, Ser. No. 188,383
6 Claims. (Cl. 251—185)

This invention relates to motor-operated fluid valves such as are used for distributing heat exchange fluids to room conditioners in domestic heating and cooling systems. In one of its embodiments the invention comprises a rotary valve element operated in one direction by an electric motor and in the opposite direction by a spring motor.

One object of the present invention is to provide a motor-operated valve which is designed to utilize a conventional low cost electric motor.

A further object of the invention is to provide a fluid valve of the electric motor-spring motor type, wherein the spring is arranged to have a relatively high mechanical efficiency.

A further object of the invention is to provide a motor-operated valve which is of compact relatively low cost construction.

Another object of the invention is to provide a motor-operated valve wherein the component parts may be easily assembled together and when assembled will operate satisfactorily without extensive testing or fitting operations.

An additional object is to provide a motor-operated valve which may be easily serviced in the field.

Another object is to provide a motor-operated valve wherein the motor portion is removably disposed atop the valve portion so that the two portions may be readily separated from one another for repair or replacement purposes.

A still further object is to provide a motor-operated valve in which the valve element enjoys a good sealing action without sticking.

Other objects of this invention will appear from the following description and appended claims, reference being had to the accompanying drawings forming a part of this specification wherein like reference characters designate corresponding parts in the several views.

In the drawings:

FIGURE 1 is a sectional view of one embodiment of the invention taken on line 1—1 in FIG. 2;

FIG. 2 is a sectional view taken on line 2—2 in FIG. 1;

FIG. 3 is a sectional view taken on line 3—3 in FIG. 1;

FIG. 4 is a fragmentary sectional view taken on line 4—4 in FIG. 2;

FIG. 5 is a sectional view taken through a valve assembly forming one part of a second embodiment of the invention;

FIG. 6 is a sectional view taken on line 6—6 in FIG. 5; and

FIG. 7 is a sectional view taken on the same line as FIG. 6 but showing the valve element in a different position of adjustment.

Before explaining the present invention in detail, it is to be understood that the invention is not limited in its application to the details of construction and arrangement of parts illustrated in the accompanying drawings, since the invention is capable of other embodimens and of being practiced or carried out in various ways. Also, it is to be understood that the phraseology or terminology employed herein is for the purpose of description and not of limitation.

Referring to FIGS. 1 and 2 of the drawings, there is shown a motorized valve 10 having a fluid valve portion 12 and an operator portion 14. The valve portion comprises a fluid pressure resistant valve body 16 having an inlet opening 18, a first outlet opening 20 and a second outlet opening 22. Fitting within openings 18, 20 and 22 are thin walled tubular coupling sleeves 19, 21 and 23, preferably formed of copper and retained in place at the factory by silver soldering 25. The outside diameter of each sleeve is closely controlled such that minimum soldering is required for sleeve retention purposes. In the field the valve may be installed by telescoping the sleeves 19, 21 and 23 over the field tubing and soldering the tubing-sleeve joints. Due to the thin walled character of the sleeves the soldering operations can be performed in the field without appreciable quantities of heat being conducted into the valve body components. Such heat as is conducted into the valve body need not be troublesome since it is contemplated in this invention that the non-metallic temperature-destructible components (such as elements 28 and 30, the O-ring around stem 36, and the sealing gaskets) can be formed of temperature resistant materials. It is believed that the valves of this invention are the first to be capable of field soldered installation without need for removing the gaskets and non-metallic inner workings of the valve body.

The illustrated valve body is provided with two flat facing surfaces 24 and 26 which converge in the direction of inlet 18 at a predetermined included angle, as for example eighteen degrees. Disposed on surfaces 24 and 26 are two annular valve seat elements 28 and 30, preferably formed of polytetrafluoroethylene or similar high strength, slightly resilient plastic material. The inwardly facing portion of these valve seat elements are sealingly engaged with a rotary ball valve element 31, a portion of which is routed out to define a passage 32 for the flow of fluid from inlet 18 to one or the other of outlet openings 20 or 22, depending on the rotated position of the ball valve element. In one of its uses the valve can be used to supply heat exchange fluid to room conditioners, in which case outlet opening 20 leads to the conditioner heat exchange coil and outlet opening 22 connects with a bypass line. When the motor portion 14 is electrically energized by a room thermostat (not shown) the valve element is moved from its illustrated position counter-clockwise so that passage 32 interconnects inlet opening 18 with outlet opening 20. When the thermostat is satisfied a spring motor in portion 14 returns the valve element to its illustrated position.

As shown in FIG. 1, the upper face of valve housing 16 carries a cover element 34 which is provided with a central bore for mounting the rotary stem 36. The lower non-circular end portion 38 of the stem is loosely connected with the ball valve element while allowing said element to maintain a continuous sealing contact with the valve seats 28 and 30.

The convergent character of surfaces 24 and 26, together with the loose connection at 38, enables the ball valve element to have sealing contact with the valve seat elements 28 and 30 even in spite of manufacturing tolerance variations in the ball valve or seat elements. It has been found however that for best performance the included angle between surfaces 24 and 26 is at least ten degrees and in some cases a minimum of eighteen degrees. If the angle is less than a minimum value the ball has a tendency to become locked between the seats after a period of service. This is believed due to the fact that under certain conditions when the plastic seat elements 28 and 30 are under pressure and are alternately exposed to hot and cold fluids they tend to undergo permanent deformation such that the ball tends to progressively move downward toward inlet 18 and become wedged in a locked position. More particularly, when seat elements 28 and 30 are under pressure and are heated by hot fluids they flow slightly and thus deform; when they are subsequently cooled they do not completely return to their initial shape but tend to retain their deformed configurations, especially if they have pressure contact with ball 31. On continual heating and cooling further deformations of the valve seats take place, with consequent tendency of the ball valve to force the seat elements down further along surfaces 24 and 26. If the included angle between surfaces 24 and 26 is less than a predetermined value the ball exerts too much pressure on seat elements 28 and 30 such as to cause permanent seat deformation and wedge action. However if the included angle between surfaces 24 and 26 is above a predetermined value the ball is enabled to spring back when the seat elements want to expand so that little or no permanent seat deformation and wedge action takes place; as a result the valve continues to operate for a satisfactory service life. When the finish on surfaces 24 and 26 is very smooth the included angle can be as low as ten degrees, whereas with roughened surfaces at 24 and 26 the minimum permissible included angle is higher, as for example eighteen degrees.

Referring now to the operator portion 14 of the valve, there is provided a housing 51 having end walls 50 and 52, a front wall 54, a rear wall 56, and a bottom wall 58. The housing is removably positioned on a bracket 60 which is secured to cover element 34 by two of the screws which secure the cover element to valve body 16. Preferably the bracket is provided with two upstanding legs 62, each of which is configured to define an upwardly facing shoulder 64 and a detent portion 66. The arrangement permits the housing 51 to be installed onto bracket 60 by a downward motion such that the detents 66 snap through openings in wall 58 and onto the upper surfaces of housing wall 58. In the installed position of housing 51 the housing is spaced from valve body 16 so that cold fluids in the valve body are precluded from cooling the housing 51 components sufficiently by conduction as would cause atmospheric condensate to form on or adjacent electric motor 82. This arrangement tends to promote increased service life.

As will be seen from FIG. 1, the non-circular portion 68 of valve stem 36 is disposed within a non-circular recess in the large diameter pinion gear 72. Gear 72 is provided with a reduced diameter circular hub portion 74 which fits within a circular opening in the partition or platform 76; thus the gear is mounted for rotary movement within housing 51. It will be seen that partition 76 extends within and across housing 51 so as to define a gear compartment 78 and a motor compartment 80. The upper face of partition 76 mounts an electric motor 82, which is preferably of the type shown in U.S. Patents 2,334,040 and 2,353,305.

The terminals for the motor leads and power leads may be disposed on partition 76; preferably the partition is removably mounted in housing 51 to permit access to the components within compartment 78. Both surfaces of partition 76 are utilized as component mounting surfaces so that a sub-assembly can be built up and then installed in housing 51 to form the complete operator.

The motors shown in the above-noted patents incorporate speed reduction gearing therein so that the output shaft thereof rotates at a fairly low speed. In the illustrated construction the output shaft for motor 82 is designated by numeral 84. This output shaft is in the present instance constructed as a small pinion gear having its teeth meshed with the teeth of the large pinion gear 72, the arrangement being such as to provide speed reduction between pinion 84 and the valve element stem 36. In the illustrated valve the valve element is required to move only approximately ninety degrees between its two operating positions. Therefore pinion gear 72 is provided with teeth only part way around its periphery.

In the FIG. 2 position gear 72 is at the limit of its movement in the clockwise direction, and valve element 31 is in a position admitting fluid to the outlet 22. The electric motor is arranged to drive pinion 84 in the clockwise direction (FIG. 2) so that when the motor is energized the large diameter gear 72 will move in the counterclockwise direction to thus rotate the ball valve element to a position wherein fluid flows from the inlet 18 to outlet 20. Pinion gear 84 is suitably connected with one end portion of a multi-convolution leaf coil spring motor 86, which has its other end connected to a fixed anchorage 87 located on the underside of partition 76. During clockwise movement of pinion 84 the spring is progressively loaded, so that when the motor 82 is de-energized the spring force rotates pinion 84 counterclockwise to return the large diameter gear 72 to its illustrated position. The spring force is correlated with the motor torque so that during the time motor 82 is energized a predetermined clockwise movement of gear 72 causes the motor to stall and the components to hold their positions. During return movement by spring 86 the rotor of the motor merely reverses its motion, and there is no need to disengage the gear train from the motor. By keeping the motor continually engaged, during the return movement there is provided a braking action for slowing the valve and gear motions to minimize noise and prevent water hammer.

The disposition of spring 86 in operative connection with the small pinion 84 is particularly advantageous in that it permits the spring to have a higher operating efficiency than it would have if it were conected for example with the large pinion 72. Thus, if the spring were arranged to act on the large pinion, the large pinion would have to drive the small pinion during unwinding of the spring. There is a mechanical friction disadvantage in driving a small pinion from a large pinion, whereas there is a material mechanical advantage in driving from the small pinion to the large pinion. Additionally, by having the spring operate on the small pinion it is much easier to obtain a slow valve element motion, which is desirable for preventing audible water hammer and gear noise. Therefore it is particularly desirable to have the spring act on the small pinion rather than elsewhere in the system.

It will be seen from FIGS. 1 and 2 that an electrical snap switch 88 is disposed in the right hand portion of gear chamber 78. When the valve is used as a heat exchange fluid valve this switch is connected into the electric circuitry so as to control the fluid circulating pump or another component such as a fuel gas valve. The general arrangement is such that when the thermostat calls for conditioning the fluid valve 31 introduces fluid to the zone to be conditioned, and the switch 88 is energized to operate the circulating pump for the heat exchange fluid.

Preferably motor 82 is of low voltage and its terminals are located on the left end portion of partition 76. Switch 88 is in many cases in a high voltage line so that motor 82 is physically interposed between the high and low voltages, which is a desired safety feature.

The push button operator 90 for switch 88 registers with a spring arm 92, which is anchored to the housing front wall 54, as at 94. A portion of gear 72 is cut away, as at 96, to define the cam surface 100. In operation, when the thermostat energizes motor 82 to move gear 72 counterclockwise cam surface 100 strikes the spring arm 92 so as to actuate the switch 88. The use of a spring arm 92 and electric switch 88 provides a very compact and efficient construction which enables the assembly of parts to satisfactorily perform a multiplicity of functions.

As above noted, housing 51 is removably disposed on the valve body. This removable mounting is particularly advantageous in that when the housing is removed the upper end portion 68 of the valve stem is exposed. Thus, if it is necessary to manually operate the valve stem, as in testing, servicing, or in the event of power failure, a wrench or the like can be applied to stem portion 68 to operate the valve element between its two positions. If it is desired to operate the valve element without removing housing 51 there can be provided a manual lever 104. This lever encircles gear portion 106 which comprises two radially projecting arms 108 arranged to engage teeth 110 formed on the annular portion 112 of the lever. The lever normally occupies its FIG. 2 position, with the outer end portion thereof projecting through a slot 114 formed in housing rear wall 56. During motor-induced counterclockwise movement of gear 72 from its FIG. 2 position lever 104 remains in its FIG. 2 position, i.e., the internal circular surface on lever 104 provides a lost motion connection. However, for servicing or in the event of power failure such that gear 72 cannot be operated by the motor, the lever 104 can be moved counterclockwise, with the teeth 110 thereof transmitting the rotation to the gear 72.

It is not desired that lever 104 be left in its counterclockwise position after use. However to guard against inadvertence in this regard there may be provided a return mechanism which is triggered by resumption of electric power. The return mechanism comprises a relatively wide slot portion 118 formed at the end of narrow slot portion 116. Surface 119 defined by slot portion 118 forms an undercut shoulder so that when the lever is moved into slot portion 118 it can engage the shoulder 119 and be locked thereagainst even though the spring 86 wants to drive it clockwise due to its drive through the two gears 84 and 72. As long as motor 82 is de-energized spring 86 tends to maintain lever 104 in a locked position against surface 119. However, when the motor 82 is energized, as on resumption of electrical power, it tends to move the lever counterclockwise away from surface 119 so that the leaf spring 120 is free to pop the lever up. When the electric motor is subsequently de-energized spring 86 acts through the pinions 84 and 72 to move lever 104 clockwise to its FIG. 2 position. In this manner the lever may be used to move the valve to a position opening outlet 20, and the manual operator later returned to its FIG. 2 stand-by position automatically without interfering with proper operation of the assembly.

It is realized that it would be possible to fixedly secure manual operator 104 to pinion gear 72. However, in some cases the valve may be installed in close quarters such that movement of lever 104 during normal operation would cause the lever to strike adjacent structure. It is for this reason that the lever is preferably mounted on the gear with the lost motion connection as above described. The lever operator may be eliminated if it is desired to operate the valve manually by first removing housing 51.

FIGS. 1 through 4 illustrate the invention as used in a rotary valve having a ball valve element which engages two annular seats 24 and 26. It is possible however to employ some features of the invention in constructions having other types of rotary valves. For example, the construction shown in FIGS. 5, 6 and 7 shows a two port valve arrangement wherein the ball valve element engages only one annular valve seat 125. Preferably seat 125 fits within a recess in the valve body and is provided with a peripheral slit which forms a resilient peripheral lip 127. By this arrangement the lip enjoys a tight interference engagement with the confining surfaces of the recess to prevent the seat 125 from being dislodged from its designated location during service.

In the FIG. 5 form of the invention the ball element is formed as a metal stamping 120 having a lower wall portion 122, an upper wall portion 124 and an interconnecting spherical portion 126. Wall portions 122 and 124 are provided with central openings to receive the axially aligned post 128 and stem portion 38. In production it is very difficult to maintain the tolerances on the post, stem, valve element, and valve seat so as to in all cases insure a satisfactory sealing engagement between the spherical surface 126 and the valve seat 30, without special precautions being taken. In the illustrated device such special precautions take the form of cooperating structure responsive to movement of the valve element for shifting same at right angles to the seat plane. The cooperating structure comprises an abutment element 130 secured to the valve housing and a spring arm 132 connected to the valve element, as by means of a rivet 134.

Arm 132 is arranged so that during counterclockwise rotation of the valve element the spring arm strikes abutment element 130 and is deformed to exert a force on the valve element tending to move same at right angles to the plane of seat 125 as denoted by arrow 133. To accommodate the closing motion of the valve element the stem-receiving opening 136 is made slightly longer than the corresponding dimension of stem portion 38. Thus, the valve element is yieldingly forced against seat 125 irrespective of the fluid pressure in the valve or manufacturing tolerance variations. If desired the positions of the spring arm and abutment element could be reversed, i.e., the spring arm could be mounted in the valve element and the abutment element could be mounted on the valve element. In the illustrated arrangement spring arm 132 is provided with turned ends 135 which constitute stop portions for cooperation with abutment element 130 to prevent such excessive rotational movement of the ball element as would snap the spring arm past element 130 or otherwise cause misalignment of the ball and valve seat.

The motor operator for the FIG. 5 valve is not shown, but it will be understood that it can be of the same construction as operator 14 shown in FIG. 1. Variations in construction and arrangement can be resorted to without departing from the spirit of the invention as set forth in the accompanying claims.

I claim:
1. In combination, a fluid valve housing having an annular valve seat therein; a rotary valve element having a spherical surface centered about its axis of rotation and within the valve housing to move back and forth across the seat; a rotary stem arranged in the housing substantially normal to the valve seat axis and having a driving connection with the valve element which precludes relative rotation between the stem and element but which permits radial movement of the element on the stem; an abutment fixed in the valve housing; and a spring member carried by the valve element in spaced registry with the abutment so that during rotary movement of the element toward the closed position the spring member strikes the abutment and thereby propels the valve element radially toward a tight engagement with the valve seat.

2. In combination, a fluid valve housing having an annular valve seat therein; a rotary valve element arranged in the housing with a surface thereof movable back and forth across the seat; a rotary stem arranged in the housing substantially normal to the valve seat axis and having a driving connection with the valve element which precludes relative rotation between the stem and element but which permits free movement of the element radially of the stem; an abutment fixed on one of said housing and valve element; and a spring member carried by the other of said housing and valve element in spaced registry with the abutment so that during rotary movement of the element toward the closed position the spring member and abutment strike one another to thereby propel the valve element radially of the stem toward a tight engagement with the valve seat.

3. In combination, a fluid valve housing having an annular valve seat therein; a rotary valve element arranged in the housing with a surface thereof movable back and forth across the seat; a rotary stem arranged in the housing substantially normal to the valve seat axis and having a driving connection with the valve element which precludes relative rotation between the stem and element but which permits free movement of the element radially of the stem; an abutment fixed in said housing; and a spring member carried by the valve element in spaced registry with the abutment so that during rotary movement of the element toward the closed position the spring member strikes the abutment to propel the valve element radially of the stem toward a tight engagement with the valve seat.

4. The combination of claim 3, wherein the spring member comprises a leaf spring having one end thereof secured to the valve element and the other end thereof free to be deflected by engagement with the abutment.

5. The combination of claim 4 wherein the leaf spring extends crosswise of the rotary stem so that its free end travels in a plane radially of the stem to engage the abutment.

6. In combination, a fluid valve housing having an annular valve seat therein; a rotary valve element arranged in the housing with a surface thereof movable back and forth across the seat; a rotary stem arranged in the housing and having a driving connection with the valve element which precludes relative rotation between the stem and element but which permits free movement of the element away from the stem; an abutment fixed on one of said housing and valve element; and a leaf spring having one end thereof carried by the other of said housing and valve element, the other end of said leaf spring being free to be deflected by engagement with the abutment during rotary movement of the element toward its closed position, said leaf spring thus being effective to propel the valve element toward a tight engagement with the valve seat.

References Cited by the Examiner
UNITED STATES PATENTS

| | | | |
|---|---|---|---|
| 860,529 | 7/1907 | Corlew | 251—148 |
| 980,392 | 1/1911 | Anderson | 251—176 |
| 2,106,913 | 2/1938 | Hubbard | 251—185 X |
| 2,209,132 | 7/1940 | Parker | 251—180 X |
| 2,503,563 | 4/1950 | Ray | 251—133 X |
| 2,534,577 | 12/1950 | Courtot | 251—176 |
| 2,685,427 | 8/1954 | Bugg | 251—181 |
| 2,738,033 | 3/1956 | Towle | 185—40 |
| 2,904,956 | 9/1959 | Zenor | 251—130 X |
| 2,943,706 | 7/1960 | Morgan | 185—40 |
| 2,973,182 | 2/1961 | Gill | 251—174 |
| 2,993,677 | 7/1961 | Ford | 251—148 |
| 3,014,690 | 12/1961 | Boteler | 251—174 |
| 3,024,469 | 3/1962 | Lewis et al. | 251—134 X |
| 3,042,357 | 7/1962 | Engholdt | 251—133 X |

FOREIGN PATENTS

| | | |
|---|---|---|
| 632,548 | 11/1949 | Great Britain. |
| 886,632 | 1/1962 | Great Britain. |

M. CARY NELSON, *Primary Examiner.*

ISADOR WEIL, *Examiner.*

J. DEATON, L. KAMPSCHROR, *Assistant Examiners.*